United States Patent
Brett

(10) Patent No.: US 9,572,020 B2
(45) Date of Patent: Feb. 14, 2017

(54) APPARATUS AND METHOD SUPPORTING WIRELESS COMMUNICATIONS BETWEEN DEVICES USING DIFFERENT APPLICATION PROTOCOLS IN INDUSTRIAL CONTROL AND AUTOMATION SYSTEMS

(71) Applicant: Honeywell International Inc., Morristown, NJ (US)

(72) Inventor: Patricia Brett, Fort Washington, PA (US)

(73) Assignee: Honeywell International Inc., Morris Plains, NJ (US)

(*) Notice: Subject to any disclaimer, the term of this patent is extended or adjusted under 35 U.S.C. 154(b) by 612 days.

(21) Appl. No.: 14/031,818

(22) Filed: Sep. 19, 2013

(65) Prior Publication Data

US 2015/0081922 A1    Mar. 19, 2015

(51) Int. Cl.

| | |
|---|---|
| *H04L 29/06* | (2006.01) |
| *H04W 8/24* | (2009.01) |
| *H04L 12/40* | (2006.01) |
| *H04W 4/00* | (2009.01) |
| *H04L 29/08* | (2006.01) |

(52) U.S. Cl.
CPC ........ *H04W 8/245* (2013.01); *H04L 12/40091* (2013.01); *H04L 69/08* (2013.01); *H04W 4/006* (2013.01); *H04L 67/12* (2013.01)

(58) Field of Classification Search
CPC .................................................. H04L 69/08
See application file for complete search history.

(56) References Cited

U.S. PATENT DOCUMENTS

| | | |
|---|---|---|
| 5,333,175 A | 7/1994 | Ariyavisitakul et al. |
| 6,522,881 B1 | 2/2003 | Feder et al. |
| 7,051,143 B2 | 5/2006 | White, III et al. |
| 2004/0054829 A1 | 3/2004 | White, III et al. |
| 2004/0203459 A1 | 10/2004 | Borras-Chia et al. |
| 2005/0068970 A1 | 3/2005 | Srikrishna et al. |

(Continued)

OTHER PUBLICATIONS

Mark Nixon, "A Comparison of WirelessHART(TM) and ISA100.11a", Sep. 23, 2012, Emerson Process Management.*

(Continued)

*Primary Examiner* — Aaron Strange

(57) ABSTRACT

A method includes communicating at a translator device with first devices in a first network using a first protocol and with second devices in a second network using a second protocol. The method also includes receiving data messages at the translator device, where the data messages include first data messages communicated between devices using a common protocol and second data messages communicated between devices using different protocols. The method further includes communicating each first data message from the translator device, where each first data message is routed towards a destination using the common protocol associated with the first data message. In addition, the method includes, for each second data message, translating contents of the second data message at the translator device to generate a new data message compliant with another protocol and communicating the new data message from the translator device towards a destination over the first or second network.

20 Claims, 6 Drawing Sheets

(56) References Cited

U.S. PATENT DOCUMENTS

| | | |
|---|---|---|
| 2006/0013205 A1* | 1/2006 | Daniell ............... G06Q 10/107 |
| | | 370/352 |
| 2006/0020697 A1 | 1/2006 | Kelso et al. |
| 2007/0067471 A1* | 3/2007 | Wolfe .................... H04L 69/08 |
| | | 709/230 |
| 2007/0179721 A1 | 8/2007 | Yaney |
| 2008/0205290 A1 | 8/2008 | Wille et al. |
| 2008/0205292 A1 | 8/2008 | Denby et al. |
| 2009/0119416 A1* | 5/2009 | Sirdevan ............... G06Q 10/06 |
| | | 709/246 |
| 2009/0213771 A1 | 8/2009 | Celentano et al. |
| 2009/0316628 A1* | 12/2009 | Enns ................. H04L 12/40006 |
| | | 370/328 |
| 2010/0074141 A1 | 3/2010 | Nguyen |
| 2010/0304738 A1 | 12/2010 | Lim |
| 2012/0113859 A1 | 5/2012 | Jung et al. |
| 2012/0163192 A1 | 6/2012 | Bae |
| 2012/0236768 A1* | 9/2012 | Kolavennu ......... H04W 76/023 |
| | | 370/310 |
| 2014/0126397 A1 | 5/2014 | Hansen et al. |
| 2014/0226547 A1 | 8/2014 | Zainaldin |

OTHER PUBLICATIONS

Extended European Search Report dated Nov. 18, 2014 in connection with European Patent Application No. 14183294.9; 8 pages.
Yong, et al.; "Fieldbus Interoperation Technologies"; 5th World Congress on WCICA (vol. 4); IEEE; Jun. 15-19, 2004; 5 pages.
"TR-50-1 Reference Architecture"; Joint Workshop; Mar. 21-22, 2011; 27 pages.

* cited by examiner

APPARATUS AND METHOD SUPPORTING WIRELESS COMMUNICATIONS BETWEEN DEVICES USING DIFFERENT APPLICATION PROTOCOLS IN INDUSTRIAL CONTROL AND AUTOMATION SYSTEMS

TECHNICAL FIELD

This disclosure relates generally to industrial control and automation systems. More specifically, this disclosure relates to an apparatus and method supporting wireless communications between devices using different application protocols in industrial control and automation systems.

BACKGROUND

Wireless networks are frequently used in industrial process control systems. For example, sensors could provide measurements over a wireless network, and actuators could receive control signals over the wireless network. A controller could receive the sensor measurements and generate the control signals. A wireless network in an industrial facility often supports wireless devices that operate in accordance with a single wireless communication protocol. Devices in different wireless networks are typically able to communicate only via their respective gateways.

SUMMARY

This disclosure provides an apparatus and method supporting wireless communications between devices using different application protocols in industrial control and automation systems.

In a first embodiment, a method includes communicating at a translator device with multiple first devices in a first network using a first protocol and with multiple second devices in a second network using a second protocol. The method also includes receiving multiple data messages at the translator device, where the data messages include first data messages communicated between devices using a common protocol and second data messages communicated between devices using different protocols. The method further includes communicating each first data message from the translator device, where each first data message is routed towards a destination using the common protocol associated with the first data message. In addition, the method includes, for each second data message, translating contents of the second data message at the translator device to generate a new data message compliant with another protocol and communicating the new data message from the translator device towards a destination over the first or second network.

In a second embodiment, an apparatus includes at least one transceiver and at least one processing device. The at least one transceiver is configured to communicate with multiple first devices in a first network using a first protocol and with multiple second devices in a second network using a second protocol. The at least one transceiver is also configured to receive multiple data messages including first data messages communicated between devices using a common protocol and second data messages communicated between devices using different protocols. The at least one transceiver is further configured to communicate each first data message from the apparatus towards a destination using the common protocol associated with the first data message. The at least one processing device is configured for each second data message to translate contents of the second data message and generate a new data message compliant with another protocol. The at least one transceiver is configured to communicate the new data message from the apparatus towards a destination over the first or second network.

In a third embodiment, a non-transitory computer readable medium embodies a computer program. The computer program includes computer readable program code for communicating with multiple first devices in a first network using a first protocol and with multiple second devices in a second network using a second protocol. The computer program also includes computer readable program code for receiving multiple data messages including first data messages communicated between devices using a common protocol and second data messages communicated between devices using different protocols. The computer program further includes computer readable program code for initiating communication of each first data message towards a destination using the common protocol associated with the first data message. In addition, the computer program includes computer readable program code that, for each second data message, is for translating contents of the second data message to generate a new data message compliant with another protocol and initiating communication of the new data message towards a destination over the first or second network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
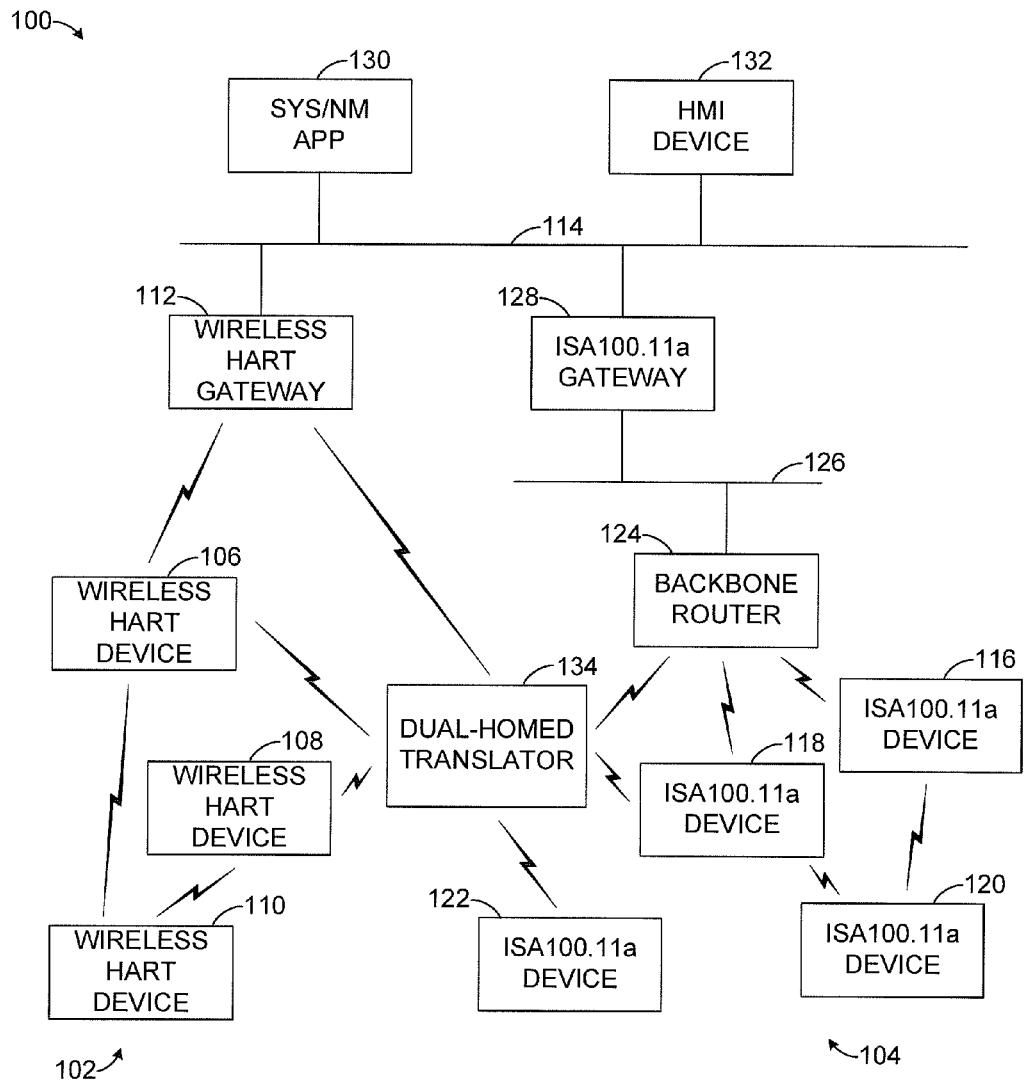
FIG. 1 illustrates a portion of an example industrial control and automation system according to this disclosure.

FIG. 1 illustrates a portion of an example industrial control and automation system 100 according to this disclosure. As shown in FIG. 1, the system 100 includes at least two wireless networks 102-104 that support different application protocols. In this example, the network 102 supports a Wireless Highway Addressable Remote Transducer (WirelessHART®) protocol, and the network 104 supports an ISA100.11a protocol. However, any other or additional wireless network(s) supporting any other or additional wireless protocol(s) could be used, such as a ZIGBEE wireless network.

In FIG. 1, the network 102 includes WirelessHART devices 106-110, which communicate with one another and with a WirelessHART gateway 112. The WirelessHART devices 106-110 represent any suitable devices that use a WirelessHART protocol to communicate. For example, the WirelessHART devices 106-110 could represent wireless sensors that generate sensor measurements associated with a process system. A process system represents any system or portion thereof configured to process one or more materials in some manner. The WirelessHART devices 106-110 could also represent wireless actuators that alter one or more characteristics of the process system. The WirelessHART devices 106-110 could further represent wireless controllers that use sensor measurements to generate control signal for actuators. The WirelessHART devices 106-110 could perform any other or additional functions.

The WirelessHART gateway 112 supports the interaction between WirelessHART devices and a network that uses a different protocol. For example, the WirelessHART gateway 112 can receive Ethernet-formatted data or other data over a network 114 and format the data for transmission using the WirelessHART protocol. The WirelessHART gateway 112 can also receive WirelessHART-formatted data from one or more WirelessHART devices 106-110 and format the data for transmission over the network 114.

Each WirelessHART device 106-110 includes any suitable structure for communicating using a WirelessHART protocol. The WirelessHART gateway 112 includes any suitable structure for facilitating communications between WirelessHART devices and a network. The network 114 represents any suitable network or combination of networks facilitating communication between devices, such as an Ethernet network.

In FIG. 1, the network 104 includes ISA100.11a devices 116-122, which communicate with one another and with a backbone router 124. The ISA100.11a devices 116-122 represent any suitable devices that use an ISA100.11a protocol to communicate. For example, the ISA100.11a devices 116-122 could represent wireless sensors, wireless actuators, and wireless controllers. The ISA100.11a devices 116-122 could perform any other or additional functions.

The backbone router 124 generally supports the interaction between ISA100.11a devices and other devices. For example, the backbone router 124 could represent one of multiple backbone routers that send ISA100.11a data over a network 126 to an ISA100.11a gateway 128 (or to other backbone routers that forward the data to the gateway 128). The ISA100.11a gateway 128 generally supports the interaction between ISA100.11a devices and a network that uses a different protocol. For example, the ISA100.11a gateway 128 can receive Ethernet-formatted data or other data from the network 114 and generate ISA100.11a-formatted data for the ISA100.11a devices 116-122. The ISA100.11a gateway 128 can also receive ISA100.11a-formatted data from the ISA100.11a devices 116-122 and generate Ethernet-formatted data for the network 114. Note that the ISA100.11a devices 116-122 could communicate directly with the ISA100.11a gateway 128, omitting the backbone router 124 and network 126.

Each ISA100.11a device 116-122 includes any suitable structure for communicating using an ISA100.11a protocol. The backbone router 124 represents any suitable structure for routing ISA100.11a data over a backbone connection. The network 126 represents any suitable network or combination of networks facilitating communication between devices, such as an Ethernet network. The ISA100.11a gateway 128 includes any suitable structure for facilitating communications between ISA100.11a devices and a network.

In this example, a system/node manager application 130 and a human-machine interface (HMI) device 132 are also coupled to the network 114. The system/node manager application 130 helps to manage the operations of the various wireless devices in the system 100. For example, the system/node manager application 130 could support the distribution of policies for the WirelessHART and ISA100.11a wireless devices. These policies can affect various characteristics of the wireless devices' operations, such as transmit or receive frequency or frequencies and security parameters. The system/node manager application 130 includes any suitable structure for managing wireless devices in the system 100, such as a computing device executing one or more applications. The HMI device 132 supports a user interface for interacting with various devices in the system 100, such as the system/node manager application 130. The HMI device 132 includes any suitable user interface device(s), such as a keyboard, mouse, and monitor. Note that any other or additional devices can be connected to the network 114, such as a process data historian or higher-level process controllers.

As described above, a wireless network in an industrial facility often supports wireless devices that operate in accordance with a single wireless communication protocol. However, wireless devices are currently available that use a wide variety of wireless communication protocols. It is often necessary or desirable to use devices that support different wireless communication protocols in the same industrial facility. This can create problems when devices using different protocols need to interact with one another.

In some conventional approaches, at least one gateway is provided for each protocol. When a device using a first protocol needs to interact with a device using a second protocol, each device communicates with its respective gateway. The gateways also communicate with an application in a host control system, which can reformat the data being sent between the devices. While often effective, these approaches can significantly increase the latency in communications between devices that use different protocols.

In accordance with this disclosure, at least one "multi-homed" translator 134 is inserted into the wireless networks 102-104 in the system 100. The translator 134 has the ability to communicate wirelessly using multiple wireless protocols, such as WirelessHART and ISA100.11a. As a result, the translator 134 is able to join each wireless network 102-104 in the system 100. Moreover, the translator 134 supports peer-to-peer communications between wireless devices in the system 100, meaning devices that use a common protocol or different protocols can communicate with one another without going through their respective gateways. The translator 134 accomplishes this by (i) acting as a router between devices that use the same protocol and (ii) translating or reformatting message contents and acting as a router between devices that use different protocols.

In particular embodiments, the networks 102-104 represent wireless mesh networks, star networks, or networks having other configurations. The "multi-homed" translator 134 can simply be installed in a location where it can join both networks 102-104. For any WirelessHART or ISA100.11a devices that are in communication range, the translator 134 can then function as a router to help route data messages through the networks. For any communications involving devices that use different protocols, the translator 134 can also translate or reformat the associated data messages.

The translating function of the translator 134 can be implemented in any suitable manner. For example, the translator 134 could include program code that directly maps data between the WirelessHART and ISA100.11a protocols (or other protocol(s)). Alternatively, the translator 134 could support the use of eXtensible Markup Language (XML) or other markup language. A message from a wireless device could identify whether data is being sent in a native format (for delivery to another device using the same protocol) or in an XML format (for delivery to a device using a different protocol). If the XML format is used, the translator 134 can map data from the received message to the fields of a message in a different protocol. Note, however, that the translating function can be implemented in any other suitable manner.

The "multi-homed" translator 134 includes any suitable structure for joining multiple networks and translating between the protocols of those networks. For example, the translator 134 could include one or multiple transceivers allowing the translator 134 to communicate with devices using different protocols. The translator 134 could optionally incorporate additional functions, such as functions of other devices in the system 100. For instance, the translator 134 could include sensor, actuator, or controller functionality associated with the wireless devices 106-110 and/or the wireless devices 116-122. Additional details regarding the "multi-homed" translator 134 are provided below.

Although FIG. 1 illustrates a portion of one example industrial control and automation system 100, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, particular functions have been described as being performed by particular components of the system 100. This is for illustration only. In general, industrial process control and automation systems are highly configurable and can be configured in any suitable manner according to particular needs. Moreover, the translator 134 is not limited to translating between two protocols and could communicate with devices using three or more protocols. In addition, FIG. 1 illustrates one example operational environment where the use of a multi-homed translator can be supported. This functionality could be used in any other suitable system.

Figure 2:
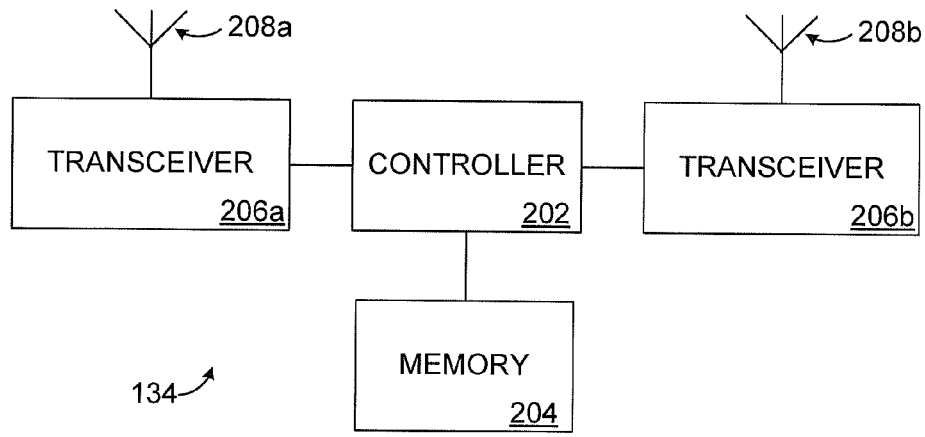
FIGS. 2 and 3 illustrate an example multi-homed translator for use in an industrial control and automation system according to this disclosure.
Figure 3:
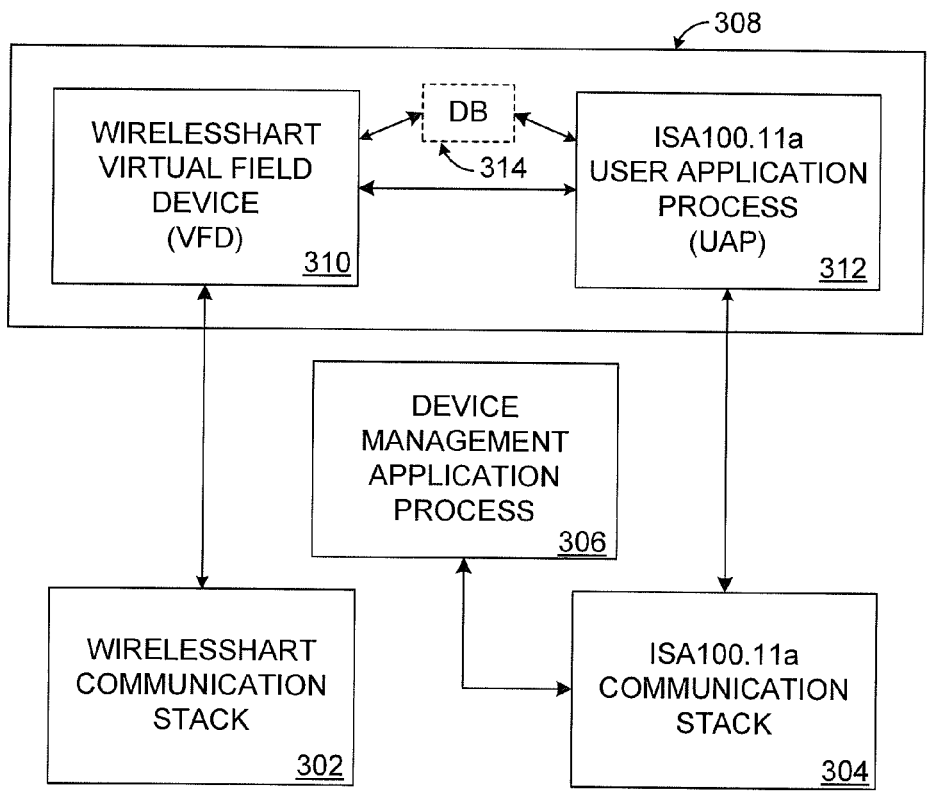

FIGS. 2 and 3 illustrate an example multi-homed translator 134 for use in an industrial control and automation system according to this disclosure. As shown in FIG. 2, the translator 134 includes a controller 202. The controller 202 controls the overall operation of the translator 134. For example, the controller 202 may receive data messages to be routed in one or more wireless networks, and the controller 202 could provide the data messages to one or more other components in the translator 134 for wireless transmission. The controller 202 could also perform translation functions to translate the contents of the data messages before routing the data messages between devices that use different protocols. The controller 202 includes any suitable structure for controlling the operation of the translator 134. As particular examples, the controller 202 could represent a processor, microprocessor, microcontroller, field programmable gate array (FPGA), digital signal processor, discreet logic, or other processing or control device(s).

A memory 204 is coupled to the controller 202. The memory 204 stores any of a wide variety of information used, collected, or generated by the translator 134. For example, the memory 204 could store data messages being routed within a wireless network or between wireless networks. The memory 204 includes any suitable volatile and/or non-volatile storage and retrieval device or devices.

The translator 134 also includes one or more wireless transceivers 206a-206b coupled to one or more antennas 208a-208b. The transceiver(s) 206a-206b and antenna(s) 208a-208b can be used by the translator 134 to communicate wirelessly with other devices. For example, the translator 134 could use the transceiver 206a and antenna 208a to communicate with the WirelessHART devices 106-110, and the translator 134 could use the transceiver 206b and antenna 208b to communicate with the ISA100.11a devices 116-122. In this way, the translator 134 can remain in constant communication with devices using both protocols. Note, however, that a single transceiver could use different protocols to communicate in different time slots, at different frequencies, or in some other shared manner. One example of using a common transceiver with multiple protocols is described in U.S. patent application Ser. No. 13/871,897, which is hereby incorporated by reference in its entirety. Each transceiver 206a-206b may be coupled to its own antennas 208a-208b, or multiple transceivers 206a-206b can share a common antenna.

Each transceiver 206a-206b includes any suitable structure for generating signals to be transmitted wirelessly and/or receiving signals received wirelessly. In some embodiments, each transceiver 206a-206b represents an RF transceiver. Each transceiver could also include a transmitter and a separate receiver. In some embodiments, each antenna 208a-208b could represent an RF antenna (although any other suitable wireless signals could be used to communicate).

FIG. 3 illustrates a logical overview 300 of the multi-homed translator 134. As shown in FIG. 3, the translator 134 includes multiple communication stacks 302-304. Each communication stack 302-304 supports the various functional layers needed to communicate using one industrial wireless protocol. For example, the communication stacks 302-304 could include the physical, data link, network, transport, and other layers for supporting communications using the WirelessHART and ISA100.11a protocols, respectively. The communication stack 304 for the ISA100.11a protocol can also include an ISA100.11a application sub-layer. As noted above, however, the translator 134 could support any other or additional protocol(s), and the translator 134 could include more than two communication stacks in order to communicate using more than two protocols.

The translator 134 also includes a device management application process (DMAP) 306. The DMAP 306 manages local communication aspects of the device in which it resides (in this case, the translator 134). The DMAP 306 is also responsible for setting up the application sub-layer connections, which are often defined when the device is commissioned. The DMAP 306 can be implemented as defined in the ISA100.11a specification.

The translator 134 further includes a convergence application 308. The convergence application 308 in this example represents a wrapper that includes two applications, namely a WirelessHART virtual field device (VFD) 310 and an ISA100.11a user application process (UAP) 312. The WirelessHART VFD 310 represents an application that is configured to communicate using the WirelessHART protocol and that appears (from the perspective of WirelessHART wireless devices) to be a WirelessHART device. Similarly, the ISA100.11a UAP 312 represents an application that is configured to communicate using the ISA100.11a protocol and that appears (from the perspective of ISA100.11a wireless devices) to be an ISA100.11a device.

The WirelessHART VFD 310 is able to extract data from WirelessHART messages and to provide the data in a suitable format to the ISA100.11a UAP 312. Similarly, the ISA100.11a UAP 312 is able to extract data from ISA100.11a messages and to provide the data in a suitable format to the WirelessHART VFD 310. Communication between the WirelessHART VFD 310 and the ISA100.11a UAP 312 could be direct or indirect, such as via interprocess messaging or by use of a database (DB) 314 or other storage device(s). In this way, the data received from one wireless device using one protocol can be reformatted and placed into a message for another device that uses a different protocol.

Although FIGS. 2 and 3 illustrate one example of a multi-homed translator 134 for use in an industrial control and automation system, various changes may be made to FIGS. 2 and 3. For example, various components in FIG. 2 could be combined, subdivided, or omitted and additional components could be added according to particular needs. Also, in general, a "wireless node" or "wireless device" may represent any device that can transmit and/or receive data wirelessly, even if the wireless node or device is coupled to one or more wires (such as for receiving power or for transmitting and/or receiving data over a wired connection). Also, the functional division shown in FIG. 3 is for illustration only. Various components in FIG. 3 could be combined, subdivided, or omitted and additional components could be added according to particular needs.

Figure 4:
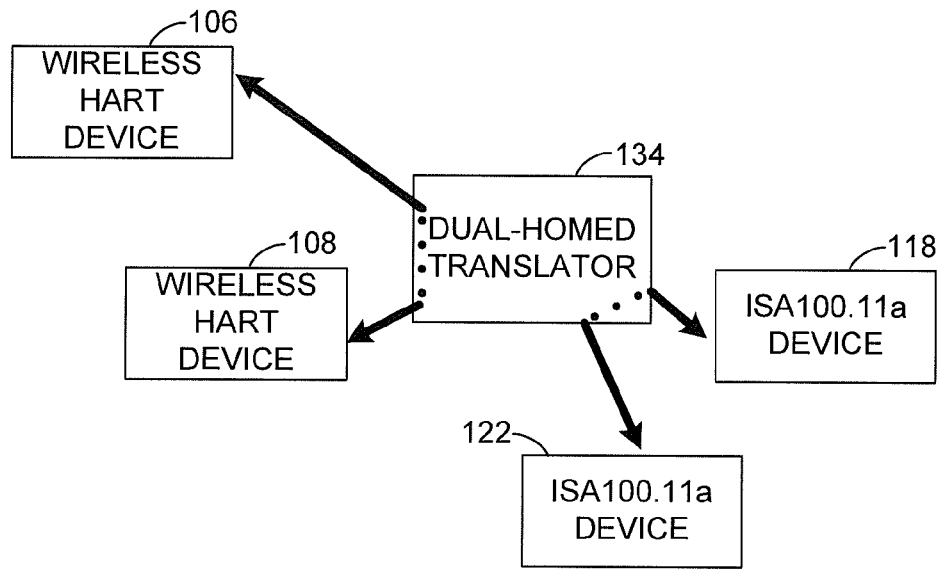
FIGS. 4 through 7 illustrate example operations of a multi-homed translator in an industrial control and automation system according to this disclosure.
Figure 5:
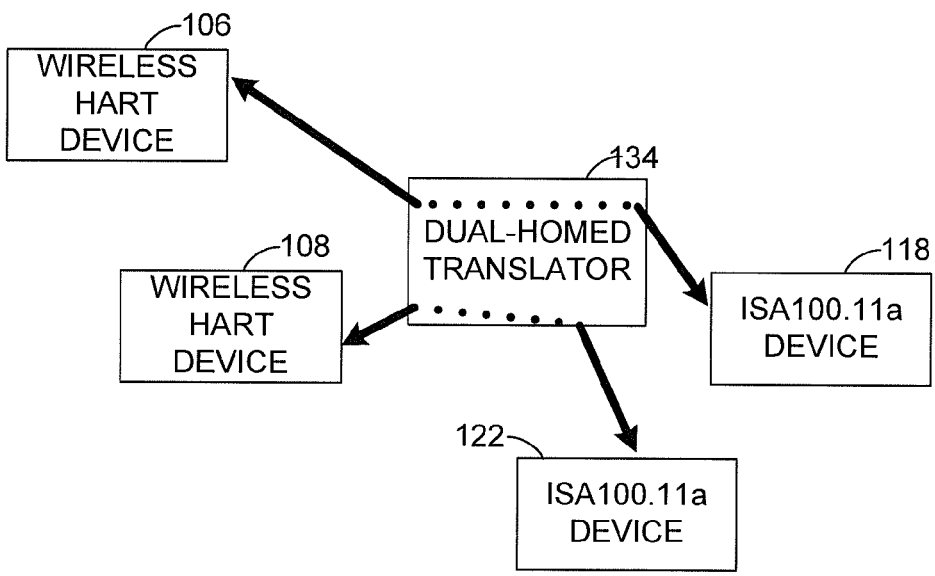

FIGS. 4 through 7 illustrate example operations of the multi-homed translator 134 in an industrial control and automation system according to this disclosure. As shown in FIGS. 4 and 5, the translator 134 can communicate with wireless devices in both wireless networks 102-104.

In FIG. 4, the multi-homed translator 134 is functioning as a router to route data between devices that use the same protocol. For example, data flowing between the WirelessHART devices 106-108 can be handled within the WirelessHART communication stack 302 of the translator 134. Similarly, data flowing between the ISA100.11a devices 118 and 122 can be handled within the ISA100.11a communication stack 304 of the translator 134. In both cases, the data need not be processed by the convergence application 308.

In FIG. 5, the multi-homed translator 134 is functioning as both a translator and a router to route data between devices that use different protocols. For example, data is flowing between the WirelessHART device 106 and the ISA100.11a device 118, and data is flowing between the WirelessHART device 108 and the ISA100.11a device 122. In both cases, the data flows through one of the communication stacks 302-304 to the convergence application 308 and then through the other of the communication stacks 302-304.

Figure 6:
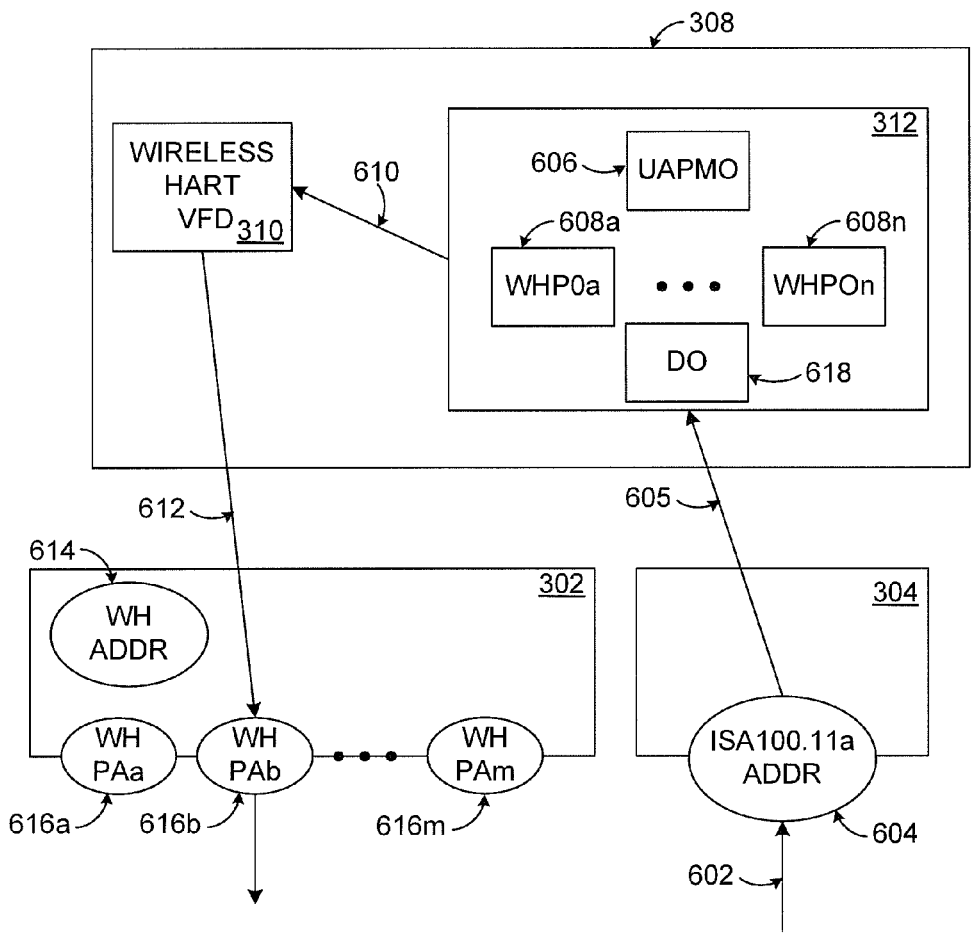

FIG. 6 illustrates an example data flow in the multi-homed translator 134 for communications from an ISA100.11a device to a WirelessHART device. As shown in FIG. 6, a data message 602 is directed to an ISA100.11a address 604. The ISA100.11a address 604 represents an address assigned to the translator 134 in the ISA100.11a network 104. The ISA100.11a address 604 can be used, for example, by the system/node manager application 130 to configure or otherwise control the operation of the translator 134 in the wireless network 104. The data message 602 could represent any suitable ISA100.11a message, such as a "read," "write," "execute," or "publish" message. When sent to the address 604, the data message 602 can be received by the communication stack 304 in the translator 134.

Contents 605 of the data message 602 are directed to the UAP 312, which in this example includes a UAP management object (UAPMO) 606 and multiple Wireless HART Peer Objects (WHPOa-WHPAn) 608a-608n. The UAPMO 606 represents an object used to manage the ISA100.11a UAP 312. The UAPMO 606 could represent a standard object defined in the ISA100.11a specification.

Each WHPO 608a-608n contains information describing a certain type of WirelessHART message. The contents of an ISA100.11a message can be directed to one or more WHPOs 608a-608n. The UAP 312 can use the information contained in the one or more WHPOs 608a-608n to provide the information via message contents 610 to the WirelessHART VFD 310, which can then generate one or more corresponding WirelessHART messages 612. Note that a single ISA100.11a message 602 could result in the generation of one or multiple WirelessHART messages 612.

In particular embodiments, each WHPO 608a-608n could include information defining all or a subset of the following attributes.

WirelessHART proxy address: a source address identifying the translator device 134 as a particular WirelessHART device to send a message being generated;

WirelessHART destination address: an address identifying the WirelessHART device to receive the WirelessHART message being generated;

Publication type: an indication whether the WirelessHART message being generated is to be sent as a scheduled transmission or an unscheduled transmission;

Timetable identifier: an identifier associated with the scheduled time for transmitting the WirelessHART message being generated to the destination (for scheduled transmissions);

AREP identifier: a WirelessHART application endpoint identifier;

Numeric index: a numeric identifier identifying the type of WirelessHART message being generated;

Subindex used flag: an indication whether a subindex value is used to further define the type of WirelessHART message being generated;

Subindex value: a numeric identifier identifying the subindex value for the WirelessHART message being generated (if the "Subindex used flag" is enabled);

WirelessHART data type(s): an identification of the data type(s) for the data to be included in the WirelessHART message being generated; and WirelessHART data value(s) and status(es): the data value(s) and corresponding status(es) to be included in the WirelessHART message being generated.

The data from the ISA100.11a message 602 can be mapped to these attributes to define a WirelessHART message 612.

Each WHPO 608a-608n can therefore use the contents 605 of an ISA100.11a data message and its own data to generate message contents 610, which are sent to the WirelessHART VFD 310. The message contents 610 contain the contents for at least one WirelessHART message. The WirelessHART VFD 310 uses the message contents 610 to generate one or more WirelessHART messages 612, which are sent to the communication stack 302. Each WHPO 608a-608n can be defined in any suitable manner, such as by an industry-specific consortium, a vendor of field devices, or a supplier of the translator device 134.

The communication stack 302 here is associated with a WirelessHART address 614. The WirelessHART address 614 represents an address assigned to the translator 134 in the WirelessHART network 102. The WirelessHART address 614 can be used, for example, by the system/node manager application 130 to configure or otherwise control the operation of the translator 134 in the wireless network 102, including establishment of WirelessHART proxy addresses (PAa-Pam) 616a-616m.

The communication stack 302 is also associated with the WirelessHART proxy addresses (PAa-PAm) 616a-616m. Each proxy address 616a-616m represents a virtual device in a WirelessHART network. Each proxy address 616a-616m can, for example, be associated with a different WHPO 608a-608n. Thus, actual WirelessHART devices 106-110 can receive data communicated from the ISA100.11a devices 116-122. In FIG. 6, each WirelessHART message 612 can appear to originate from a proxy address 616a-616m, which allows the WirelessHART devices 106-110 to operate under the assumption that they are communicating with typical WirelessHART devices.

Note that if an ISA100.11a device sends a "publication" message, the publication message can first be received by a dispersion object (DO) 618 in the UAP 312. Each dispersion object 618 may be related to one or more of the WHPOs 608a-608n. For example, if there are multiple process variable values in an ISA100.11a publication message, a single dispersion object 618 could provide the process variable values to different WHPOs. The WHPOs could then operate as described above.

Figure 7:
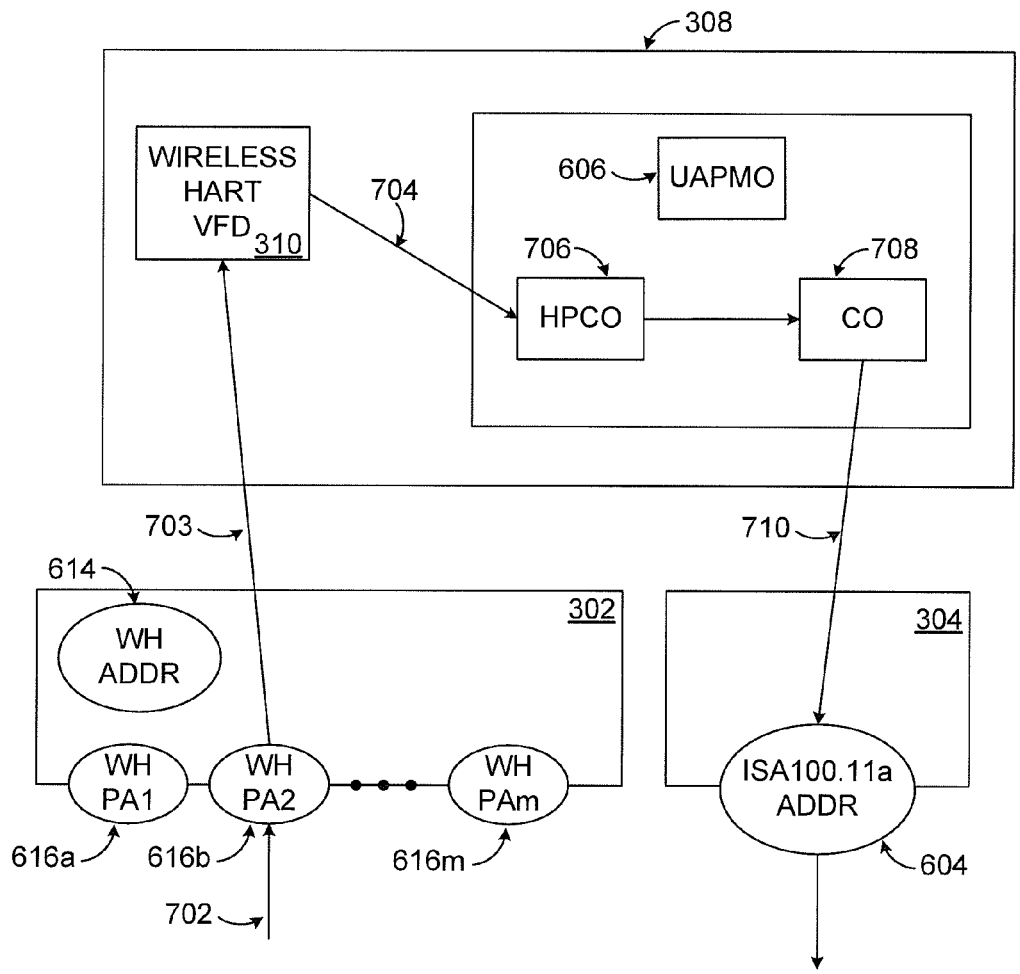

FIG. 7 illustrates an example data flow in the multi-homed translator 134 for communications from a WirelessHART device to an ISA100.11a device. As shown in FIG. 7, a data message 702 is directed to one of the WirelessHART proxy addresses 616a-616m. As noted above, a WirelessHART device can send the data message 702 to a WirelessHART proxy address. The data message 702 could represent any suitable WirelessHART message. When sent to the proxy address, the data message 702 can be received by the communication stack 302 in the translator 134.

Contents 703 of the data message 702 are directed to the WirelessHART VFD 310, which converts the contents 703 into message contents 704 sent to the UAP 312. The UAP 312 here includes various HART Process Control Objects (HPCOs) 706 and concentrator objects (COs) 708. Each HPCO 706 represents an object that generates a particular type of ISA100.11a message, and each concentrator object 708 represents an object used to publish an ISA100.11a message 710 to one or more ISA10.11a wireless devices. Note that a single WirelessHART message 702 could result in the generation of one or multiple ISA100.11a messages 710.

The WirelessHART VFD 310 can convert the contents 703 into the message contents 704 in any suitable manner. For example, the WirelessHART VFD 310 could include a peer address table that associates each proxy address 616a-616m with (i) a corresponding HPCO 706 and (ii) an array or set of attributes defining the contents of an ISA100.11a message. In particular embodiments, the array or set could include information defining all or a subset of the following attributes.

Attribute index: a numeric identifier identifying the type of ISA100.11a message being generated;

Subindex used flag: an indication whether a subindex value is used to further define the type of ISA100.11a message being generated;

Subindex value: a numeric identifier identifying the subindex value for the ISA100.11a message being generated (if the "Subindex used flag" is enabled);

Value: a value associated with the ISA100.11a attribute; and

Status: a status associated with the ISA100.11a attribute. Each HPCO 706 can contain information identifying the value(s) and status(es) for one or more attributes to be included in an ISA100.11a message.

The contents 703 of the data message 702 are converted into the message contents 704 using the array or set of attributes associated with the data message's proxy address. The message contents 704 are converted into an ISA100.11a message 710 by the HPCO 706 associated with the data message's proxy address. The ISA100.11a message 710 is provided to one of the concentrator objects 708, which publishes the ISA100.11a message 710 to the intended destination device via the communication stack 304.

Although FIGS. 4 through 7 illustrate examples of operations of a multi-homed translator 134 in an industrial control and automation system, various changes may be made to FIGS. 4 through 7. For example, the translation function of the multi-homed translator 134 could be implemented in any other suitable manner and is not limited to the use of WHPOs 608a-608n, peer address tables, and HPCOs 706. Also, FIGS. 6 and 7 do not show proxy addresses for communications involving the ISA100.11a devices. This is due to the fact that ISA100.11a does not need proxy addresses since objects can be used to distinguish devices rather than network addresses. However, proxy addresses could also be used on the right side of FIGS. 6 and 7 to communicate with other devices.

In other embodiments, the multi-homed translator 134 can use XML or another markup language to facilitate the translation of data messages between protocols. The use of a markup language can be beneficial, as it enables a human operator to easily construct a message template for a source device into which process data is added. The use of a markup language can also promote easier debugging in the event that a template is not properly constructed.

In particular embodiments, a markup language can be used as follows when publishing data from an ISA100.11a device to a WirelessHART device. In a source ISA100.11a device, the standard ISA100.11a dispersion object can be extended to add an attribute that defines a publishing mode. The publishing mode can have a value identifying either an ISA100.11a native mode or a HART_Template mode. Another attribute added to the dispersion object can be used to hold a "Visible String" that contains a markup language template. The template defines a markup language message that is used to carry a data payload. The payload may, for example, be conveyed as an octet string.

In the translator 134, the standard ISA100.11a dispersion object is also extended with an attribute that indicates the operational mode (either ISA100.11a native mode or HART_Template mode). If a data message is received from the ISA100.11a device in the ISA100.11a native mode, the data message is routed to another ISA100.11a device without translation, and the data message is not processed by the dispersion object. If a data message is received from the ISA100.11a device in the HART_Template mode, the markup language template is analyzed to extract the data payload, and the data payload is inserted into a WirelessHART message.

The markup language template contained in the data message indicates how the translator 134 is to insert information in order to convey process data to the desired destination WirelessHART device(s). For example, the markup language template may include information such as:

```
</11a_To_HART_Msg>
<11a_Source_Address> ISA100.11a Source Address </11a_Source_Address>
<11a_Destination_Addr> Translator Address On ISA100.11a Network
</11a_Destination_Addr>
<11a_UAP> UAP Identifier </11a_UAP>
<11a_src_obj> Concentrator Object ID </11a_src_obj>
<11a_Distributor_Dest_obj> 1 </11a_Distributor_dest_obj>
<Hart_Dev_Dest_Addr> WirelessHART Destination Address
</HART_Dev_Dest_Addr>
<Num_Values> 1 </Num_Values>
<11a_AnalogValue_1> 100.25 </11a_AnalogValue_1>
<11a_Status_1> GOOD <11a_Status_1>
<11a_SubStatus_1_Binary> 1000000 <11a_SubStatus_1_Binary>
</11a_To_HART_Msg>
```

In this example, element <11a_Source_Address> identifies the address of the ISA100.11a device sending the message. Element <11a_Destination_Addr> identifies the location where the source device is sending the message, which in this case is the value "Converter Address On ISA100.11a Network" (representing the address 604 of the translator 134). Element <11a_UAP> identifies the UAP 312, and element <11a_src_obj> identifies the Concentrator object of the source device. Element <11a_Distributor_Dest_obj> represents one of the dispersion objects 618. Element <Hart_Dev_Dest_Addr> identifies the destination address of the WirelessHART device to receive the message, and element <Num_Values> identifies the number of process data values included in the message. Elements <11a_AnalogValue_1>, <11a_Status_1>, and <11a_SubStatus_1_Binary> represent the process data value and its status being conveyed to the WirelessHART device. Additional process data values can be denoted with elements labeled "_2", "_3", and so on. Note that a message could be associated with other types of process data values and is not limited to analog values with binary sub-signals.

In particular embodiments, a markup language can also be used as follows when publishing data from a WirelessHART device to an ISA100.11a device. An incoming WirelessHART message can include enough information to create a corresponding ISA100.11a message. A markup language template in the WirelessHART message may include information such as:

```
</HART_To_11a_Msg>
<HART_Dest_Addr> Converter Address </HART_Dev_D-
est_Addr>
<Ultimate_.11a_destination_addr> ISA100.11a Destination Address
</Ultimate_.11a_destination_addr>
<Ultimate_.11a_destination_obj> Dispersion Object ID
</Ultimate_.11a_destination_obj>
<Num_Vals> 1 </Num_Vals>
<Val_Status_1> Placeholder for HART value and status structure
</Val_Status_1>
</HART_To_11a_Msg>
```

In this example, element <HART_Dest_Addr> identifies one of the proxy addresses 616a-616m of the translator 134. Element <Ultimate_.11a_destination_addr> identifies the destination address of an ISA100.11a device. Element <Ultimate_.11a_destination_obj> identifies the concentrator object 708 to be used to publish a message to the destination address. Element <Num_Vals> identifies the number of process data values being sent to the destination address, and <Val_Status_1> contains a HART process data value and status structure. Additional process data values can be denoted as "_2", "_3", and so on.

This represents one example technique for using a markup language to support translation operations in the multi-homed translator 134. A markup language could be used in any other suitable manner to support translation operations in the multi-homed translator 134. For example, in other embodiments, a translation schema can be defined using XML or other markup language and known only to the multi-homed translator device 134. The wireless devices need not modify their data messages or concentrator/dispersion objects. This could allow messages sent over a wireless network to become smaller, which could be beneficial in various circumstances (such as when wireless devices are battery-powered). Also, as noted above, a markup language need not be used during translation operations in the multi-homed translator 134.

Figure 8:
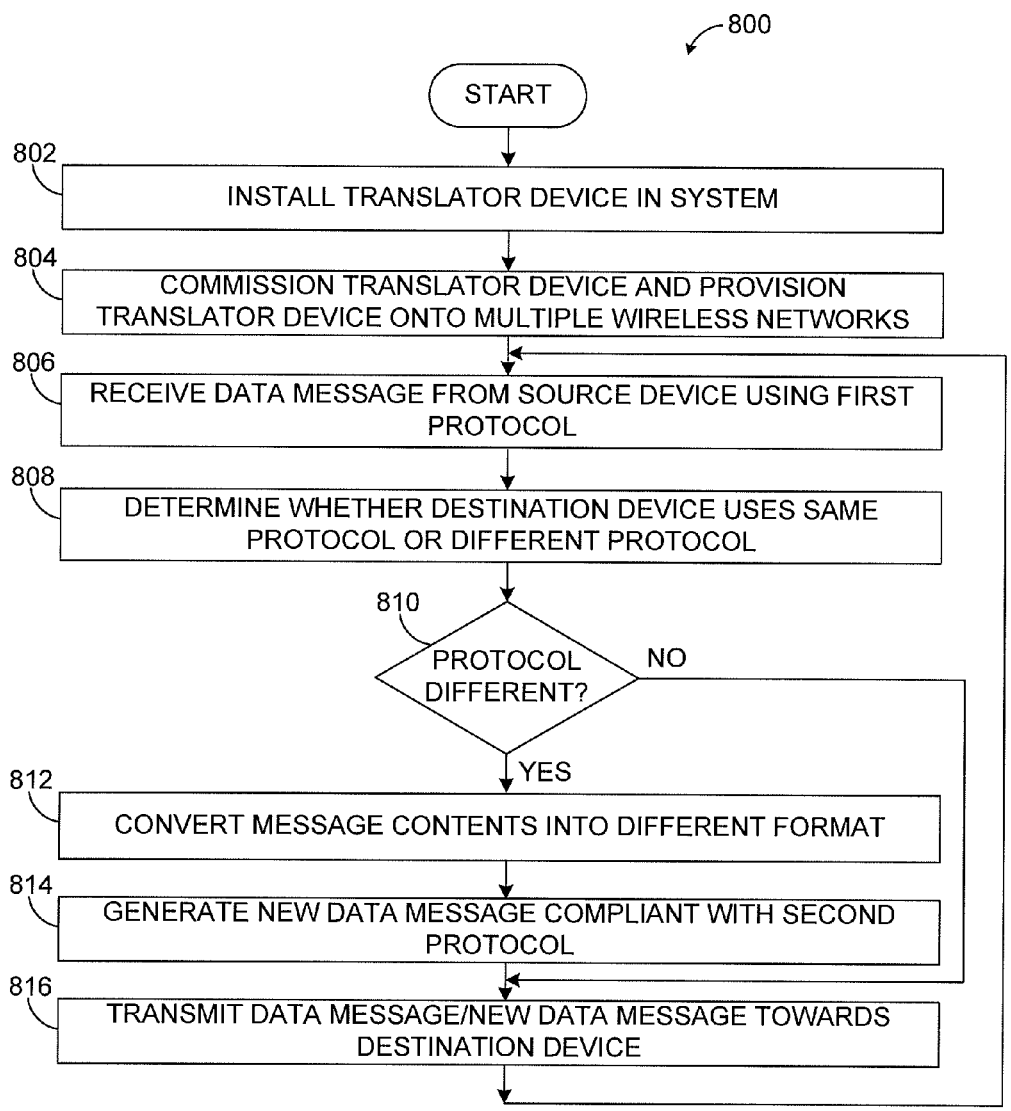
FIG. 8 illustrates an example method for supporting wireless communications between devices using different application protocols in an industrial control and automation system according to this disclosure.

FIG. 8 illustrates an example method 800 for supporting wireless communications between devices using different application protocols in an industrial control and automation system according to this disclosure. As shown in FIG. 8, a translator device is installed in an industrial system at step 802 and commissioned and provisioned onto multiple wireless networks at step 804. This could include, for example, installing the translator 134 in a location where it can join networks 102-104. This could also include providing the translator 134 with the information to be used to perform protocol translation during commissioning. This could further include providing the translator 134 with the security credentials or other information needed to join and communicate over the networks 102-104 during provisioning.

The translator device receives a data message from a source device using a first protocol at step 806. This could include, for example, a transceiver 206a-206b in the translator 134 receiving a WirelessHART message from a WirelessHART device 106-110 or an ISA100.11a message from an ISA100.11a device 116-122. A determination is made whether the destination device for the message uses the same protocol or a different protocol at step 808. This could include, for example, the controller 202 in the translator 134 determining whether the destination device is in a different wireless network. This could also include the controller 202 in the translator 134 determining whether the data message is directed at a proxy address or whether the data message is received in a native mode or XML_template mode.

If the protocol of the destination device is not different at step 810, the data message is transmitted towards the destination device at step 816. This could include, for example, the translator 134 transmitting the data message in the same format using the first protocol. In this way, the translator 134 simply acts as a router to route the data message towards its destination.

If the protocol of the destination device is different at step 810, the data message's contents are converted into a different format at step 812, and a new data message is generated that is compliant with a second protocol at step 814. The new data message is then transmitted towards the destination device at step 816. This could include, for example, the controller 202 in the translator 134 using information in a WirelessHART VFD 310 or ISA100.11a UAP 312 to define how to reformat data in one protocol's format to another protocol's format. In this way, the translator 134 can translate the data message before routing the message towards its destination.

Although FIG. 8 illustrates one example of a method 800 for supporting wireless communications between devices using different application protocols in an industrial control and automation system, various changes may be made to FIG. 8. For example, while shown as a series of steps, various steps in FIG. 8 could overlap, occur in parallel, occur in a different order, or occur any number of times. As a specific example, steps 806-816 could occur any number of times to route data messages between devices using the same protocol and to translate and route data messages between devices using different protocols.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
communicating at a translator device with multiple first devices in a first network using a first protocol and with multiple second devices in a second network using a second protocol;
receiving multiple data messages at the translator device, the data messages including first data messages communicated between devices that use a common one of the protocols and second data messages communicated between devices that use different ones of the protocols;
communicating each first data message from the translator device, each first data message routed towards a destination using the common one of the protocols associated with the first data message; and
for each second data message, translating contents of the second data message at the translator device from one of the protocols to another of the protocols to generate a new data message and communicating the new data message from the translator device towards a destination over the first or second network;
wherein a first subset of the second data messages are received over the first network using proxy addresses associated with the first protocol, the contents of the first subset are extracted using a virtual device associated with the first protocol and used by first objects associated with the second protocol to generate the new data messages associated with the first subset, and the new data messages associated with the first subset are published using second objects associated with the second protocol; and
wherein a second subset of the second data messages are received over the second network, the contents of the second subset are extracted using third objects associated with the second protocol and used by the virtual device to generate the new data messages associated with the second subset, and the new data messages associated with the second subset are communicated using the proxy addresses.

2. The method of claim 1, further comprising:
assigning a first network address in the first network to the translator device; and
assigning a second network address in the second network to the translator device.

3. The method of claim 1, further comprising:
assigning the proxy addresses to the translator device.

4. The method of claim 1, wherein the networks include a Wireless Highway Addressable Remote Transducer (WirelessHART) network and an ISA100.11a network.

5. The method of claim 4, wherein:
a specified one of the second data messages is received using a specified one of the proxy addresses;

an ISA100.11a user application process comprises the objects, and a specified one of the first objects is associated with the specified proxy address and a set of one or more attributes;
the virtual device comprises a WirelessHART virtual field device;
translating the contents of the specified second data message comprises:
  extracting data for the one or more attributes from the specified second data message using the WirelessHART virtual field device;
  passing the extracted data to the specified first object in the ISA100.11a user application process; and
  generating the new data message associated with the specified second data message using the specified first object in the ISA100.11a user application process; and
communicating the new data message associated with the specified second data message comprises publishing the new data message associated with the specified second data message using a specified one of the second objects in the ISA100.11a user application process.

6. The method of claim 4, wherein:
an ISA100.11a user application process comprises the objects;
the virtual device comprises a WirelessHART virtual field device;
translating the contents of a specified one of the second data messages comprises:
  using a specified one of the third objects in the ISA100.11a user application process to identify a WirelessHART message to be generated;
  extracting data for the WirelessHART message from the specified second data message;
  passing the extracted data to the WirelessHART virtual field device; and
  generating the new data message associated with the specified second data message using the WirelessHART virtual field device; and
communicating the new data message associated with the specified second data message comprises communicating the new data message associated with the specified second data message using a specified one of the proxy addresses.

7. The method of claim 1, wherein translating the contents of at least some of the second data messages comprises using a translation schema defined by a markup language at the translator device.

8. A method comprising:
communicating at a translator device with multiple first devices in a first network using a first protocol and with multiple second devices in a second network using a second protocol;
receiving multiple data messages at the translator device, the data messages including first data messages communicated between devices that use a common one of the protocols and second data messages communicated between devices that use different ones of the protocols;
communicating each first data message from the translator device, each first data message routed towards a destination using the common one of the protocols associated with the first data message; and
for each second data message, translating contents of the second data message at the translator device from one of the protocols to another of the protocols to generate a new data message and communicating the new data message from the translator device towards a destination over the first or second network;
wherein:
  a specified one of the second data messages comprises a markup language template;
  the markup language template contains a source address of the specified second data message, a first destination address identifying the translator device, a second destination address identifying the destination for the specified second data message, and one or more process data values and one or more corresponding statuses; and
  the translator device extracts the source address, second destination address, one or more process data values, and one or more statuses from the markup language template to generate at least one of the new data messages.

9. An apparatus comprising:
at least one transceiver configured to:
  communicate with multiple first devices in a first network using a first protocol and with multiple second devices in a second network using a second protocol;
  receive multiple data messages including first data messages communicated between devices that use a common one of the protocols and second data messages communicated between devices that use different ones of the protocols; and
  communicate each first data message from the apparatus towards a destination using the common one of the protocols associated with the first data message; and
at least one processing device configured, for each second data message, to translate contents of the second data message from one of the protocols to another of the protocols and generate a new data message, wherein the at least one transceiver is further configured to communicate the new data message from the apparatus towards a destination over the first or second network;
wherein the at least one processing device is configured to receive a first subset of the second data messages over the first network using proxy addresses associated with the first protocol, extract the contents of the first subset using a virtual device associated with the first protocol, generate the new data messages associated with the first subset using first objects associated with the second protocol, and initiate publication of the new data messages associated with the first subset using second objects associated with the second protocol; and
wherein the at least one processing device is configured to receive a second subset of the second data messages over the second network, extract the contents of the second subset using third objects associated with the second protocol, generate the new data messages associated with the second subset using the virtual device, and initiate transmission of the new data messages associated with the second subset using the proxy addresses.

10. The apparatus of claim 9, wherein the apparatus is configured to be assigned a first network address in the first network and a second network address in the second network.

11. The apparatus of claim 9, wherein the at least one transceiver is configured to communicate over a Wireless Highway Addressable Remote Transducer (WirelessHART) network and an ISA100.11a network.

12. The apparatus of claim 11, wherein:
the at least one processing device is configured to receive a specified one of the second data messages using a specified one of the proxy addresses;
the at least one processing device is configured to execute an ISA100.11a user application process comprising the objects, and a specified one of the first objects is associated with the specified proxy address and a set of one or more attributes;
the virtual device comprises a WirelessHART virtual field device;
the at least one processing device is configured to translate the contents of the specified second data message by:
  extracting data for the one or more attributes from the specified second data message using the WirelessHART virtual field device;
  passing the extracted data to the specified first object in the ISA100.11a user application process; and
  generating the new data message associated with the specified second data message using the specified first object in the ISA100.11a user application process; and
the at least one processing device is configured to publish the new data message associated with the specified second data message using a specified one of the second objects in the ISA100.11a user application process.

13. The apparatus of claim 11, wherein:
the at least one processing device is configured to execute an ISA100.11a user application process comprising the objects;
the virtual device comprises a WirelessHART virtual field device;
the at least one processing device is configured to translate the contents of a specified one of the second data messages by:
  using a specified one of the third objects in the ISA100.11a user application process to identify a WirelessHART message to be generated;
  extracting data for the WirelessHART message from the specified second data message;
  passing the extracted data to the WirelessHART virtual field device; and
  generating the new data message associated with the specified second data message using the WirelessHART virtual field device; and
the at least one processing device is configured to initiate communication of the new data message associated with the specified second data message using a specified one of the proxy addresses.

14. The apparatus of claim 9, wherein the at least one processing device is configured to translate the contents of at least some of the second data messages using a translation schema defined by a markup language.

15. An apparatus comprising:
at least one transceiver configured to:
  communicate with multiple first devices in a first network using a first protocol and with multiple second devices in a second network using a second protocol;
  receive multiple data messages including first data messages communicated between devices that use a common one of the protocols and second data messages communicated between devices that use different ones of the protocols; and
  communicate each first data message from the apparatus towards a destination using the common one of the protocols associated with the first data message; and
at least one processing device configured, for each second data message, to translate contents of the second data message from one of the protocols to another of the protocols and generate a new data message, wherein the at least one transceiver is further configured to communicate the new data message from the apparatus towards a destination over the first or second network;
wherein:
  a specified one of the second data messages comprises a markup language template;
  the markup language template contains a source address of the specified second data message, a first destination address identifying the apparatus, a second destination address identifying the destination for the specified second data message, and one or more process data values and one or more corresponding statuses; and
  the at least one processing device is configured to extract the source address, second destination address, one or more process data values, and one or more statuses from the markup language template to generate at least one of the new data messages.

16. A non-transitory computer readable medium embodying a computer program, the computer program comprising computer readable program code for:
communicating with multiple first devices in a first network using a first protocol and with multiple second devices in a second network using a second protocol;
receiving multiple data messages including first data messages communicated between devices that use a common one of the protocols and second data messages communicated between devices that use different ones of the protocols;
initiating communication of each first data message towards a destination using the common one of the protocols associated with the first data message; and
for each second data message, translating contents of the second data message from one of the protocols to another of the protocols to generate a new data message and initiating communication of the new data message towards a destination over the first or second network;
wherein a first subset of the second data messages are received over the first network using proxy addresses associated with the first protocol, the contents of the first subset are extracted using a virtual device associated with the first protocol and used by first objects associated with the second protocol to generate the new data messages associated with the first subset, and the new data messages associated with the first subset are published using second objects associated with the second protocol; and
wherein a second subset of the second data messages are received over the second network, the contents of the second subset are extracted using third objects associated with the second protocol and used by the virtual device to generate the new data messages associated with the second subset, and the new data messages associated with the second subset are communicated using the proxy addresses.

17. The computer readable medium of claim 16, wherein the computer program supports a Wireless Highway Addressable Remote Transducer (WirelessHART) protocol and an ISA100.11a protocol.

18. The computer readable medium of claim 17, wherein:
a specified one of the second data messages is associated with a specified one of the proxy addresses;
the computer readable medium embodies an ISA100.11a user application process comprising the objects, and a specified one of the first objects is associated with the specified proxy address and a set of one or more attributes;
the virtual device comprises a WirelessHART virtual field device;
the computer readable program code for translating the contents of the specified second data message comprises computer readable program code for:
  extracting data for the one or more attributes from the specified second data message using the WirelessHART virtual field device;
  passing the extracted data to the specified first object in the ISA100.11a user application process; and
  generating the new data message associated with the specified second data message using the specified first object in the ISA100.11a user application process; and
the computer readable program code for initiating communication of the new data message associated with the specified second data message comprises computer readable program code for publishing the new data message associated with the specified second data message using a specified one of the second objects in the ISA100.11a user application process.

19. The computer readable medium of claim 17, wherein:
the computer readable medium embodies an ISA100.11a user application process comprising the objects;
the virtual device comprises a WirelessHART virtual field device;
the computer readable program code for translating the contents of a specified one of the second data messages comprises computer readable program code for:
  using a specified one of the third objects in the ISA100.11a user application process to identify a WirelessHART message to be generated;
  extracting data for the WirelessHART message from the specified second data message;
  passing the extracted data to the WirelessHART virtual field device; and
  generating the new data message associated with the specified second data message using the WirelessHART virtual field device; and
the computer readable program code for initiating communication of the new data message associated with the specified second data message comprises computer readable program code for communicating the new data message associated with the specified second data message using a specified one of the proxy addresses.

20. A non-transitory computer readable medium embodying a computer program, the computer program comprising computer readable program code for:
  communicating with multiple first devices in a first network using a first protocol and with multiple second devices in a second network using a second protocol;
  receiving multiple data messages including first data messages communicated between devices that use a common one of the protocols and second data messages communicated between devices that use different ones of the protocols;
  initiating communication of each first data message towards a destination using the common one of the protocols associated with the first data message; and
  for each second data message, translating contents of the second data message from one of the protocols to another of the protocols to generate a new data message and initiating communication of the new data message towards a destination over the first or second network;
wherein:
  a specified one of the second data messages comprises a markup language template;
  the markup language template contains a source address of the specified second data message, a first destination address identifying a translator device configured to execute the computer program, a second destination address identifying the destination for the specified second data message, one or more process data values, and one or more corresponding statuses; and
  the computer readable program code for translating the contents of the specified second data message comprises computer readable program code for extracting the source address, second destination address, one or more process data values, and one or more statuses from the markup language template to generate at least one of the new data messages.

* * * * *